3,118,941
Patented Jan. 21, 1964

3,118,941
N-(DIETHYLAMINOETHYL)-N-PROPARGYLBENZYLAMINES
Leo Ralph Swett and Robert George Stein, Waukegan, Ill., assignors to Abbott Laboratories, North Chicago, Ill., a corporation of Illinois
No Drawing. Filed Apr. 2, 1962, Ser. No. 184,599
6 Claims. (Cl. 260—570.5)

This invention is directed to new and novel compounds of the formula

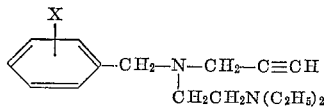

and a method for their production. In this and succeeding formulas, X represents hydrogen, chlorine, bromine or lower alkyl such as methyl, ethyl, n-propyl, isopropyl, n-butyl, sec-butyl, isobutyl or tertiary butyl as well as lower alkoxy such as methoxy, ethoxy, propoxy and butoxy.

These compounds are colorless liquids soluble in most organic solvents but insoluble in water for all practical purposes. They are useful as monoamine oxidase inhibitors and as such they can be administered orally per se or admixed with a non-toxic, pharmaceutical carrier to warm blooded animals in order to eliminate the annoying symptoms of depression. In a typical application, N-(diethylaminoethyl)-N-propargylbenzylamine completely inhibited the depressing effects of monoamine oxidase in mice when fed orally at a dosage of 25 to 50 mg./kg. of body weight.

The new compounds can be prepared by the following series of reactions:

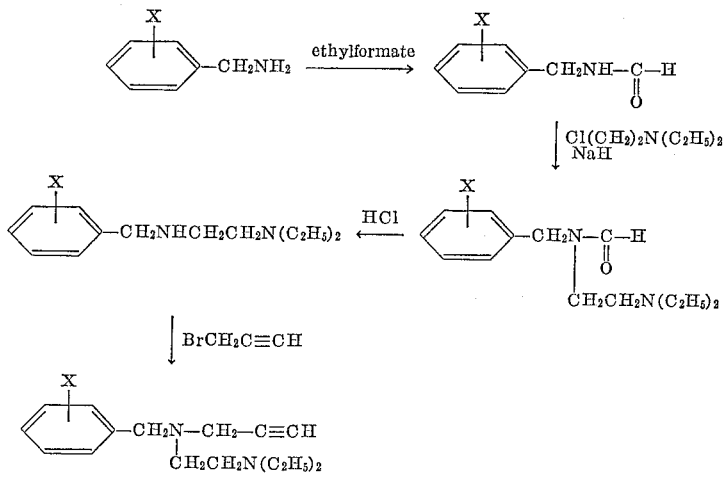

Refluxing an excess of molar amount of ethylformate with benzylamine or a substituted benzylamine will produce the corresponding N-formylbenzylamines as crystalline solids. Further reaction of the formyl derivatives with an equimolar amount of sodium hydride and diethylaminoethyl chloride in an inert, organic solvent such as dimethylformamide at room temperature followed by extraction with ether and distillation of the extract results in the formation of the intermediate N-(diethylaminoethyl)-N-formylbenzylamines which are colorless liquids readily hydrolyzed with hydrochloric acid at the reflux temperature to the corresponding N-(diethylaminoethyl)-N-benzylamines. In the final step of the reaction, equimolar amounts of one of the liquid N-(diethylaminoethyl)-N-benzylamines and propargyl bromide are refluxed in an inert solvent such as acetone in the presence of an acid acceptor such as triethylamine and upon completion of the reaction, the reaction mixture is filtered, the filtrate extracted with ether and the ether extract fractionally distilled under reduced pressure to obtain the desired N-(diethylaminoethyl)-N-propargylamines as clear, mobile liquids.

The following examples illustrate the invention in more detail but are not to be considered as limitations thereof.

EXAMPLE 1

*N-(Diethylaminoethyl)-N-Propargyl-p-Methylbenzylamine*

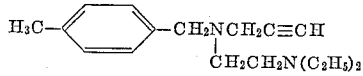

One hundred grams (0.82 mole) of p-methylbenzylamine and 95.5 grams (1.29 moles) of ethyl formate were refluxed overnight. The excess ethyl formate was removed under vacuum and the solid residue recrystallized from ether to obtain N-formyl-p-methylbenzylamine which melted at 85°–86° C.

In the second step of the reaction, 10.5 grams (0.44 mole) of sodium hydride was suspended in 200 ml. of dimethylformamide and a solution of 66 grams (0.44 mole) of N-formyl-p-methylbenzylamine in 100 ml. of dimethylformamide was added dropwise thereto with stirring. The reaction mixture was then stirred for one hours after which a solution of 60 grams (0.44 mole) of diethylaminoethyl chloride in an equal volume of dimethylformamide was added rapidly. After stirring overnight at room temperature, the entire reaction mixture was poured into two volumes of water containing 100 ml. of a saturated, aqueous sodium hydroxide solution. The basic solution was extracted twice with 150 ml. portions of ether and the combined ether extracts were dried and distilled to obtain the intermediate N-(dimethylaminoethyl)-N-formyl-p-methylbenzylamine as a colorless liquid boiling at 161°–163° C. at 1 mm. pressure and having a refractive index of $n_D^{25} = 1.5130$.

The third step of the reaction was readily accomplished by refluxing 80 grams (0.32 mole) of N-(diethylaminoethyl)-N-formyl-p-methylbenzylamine and 200 ml. of 6 N hydrochloric acid for a period of 4 hours. The reaction mixture was then made basic with 40% aqueous sodium hydroxide solution. The organic layer which formed was extracted with three 75 ml. portions of ether. Upon distillation of the ether extracts, the desired intermediate N-(diethylaminoethyl)-N-p-methylbenzylamine was obtained which boiled at 113°–114° C. at 1.4 mm. pressure and had a refractive index of 1.5000 at 25° C.

In the final step of the reaction, 50.5 grams (0.23 mole) of the intermediate amine prepared in the preceding step, 23.2 grams (0.23 mole) of triethylamine and 400 ml. of acetone were refluxed for 15 minutes and thereafter 27.3 grams (0.23 mole) of propargyl bromide was added dropwise. The reaction mixture was refluxed for 24 hours after which the triethylamine hydrobromide formed was removed by filtration. The acetone was removed from the filtrate and 100 ml. of saturated aqueous sodium carbonate solution added. The aqueous mixture was extracted with ether and the extracts distilled under reduced pressure to obtain N-(diethylaminoethyl)-N-propargyl-p-methylbenzylamine as a colorless liquid. B.P.=118°–121° C. at 0.8 mm. pressure. $n_D^{25}$=1.5045.

EXAMPLE 2

By substituting benzylamine for the p-methylbenzylamine in Example 1, there is obtained N-formylbenzylamine melting at 58°–60° C. which when reacted with diethylaminoethyl chloride forms N-(diethylaminoethyl)-N-formylbenzylamine boiling at 144°–146° C. at 0.5 mm. pressure and having a refractive index of 1.5150 at 25° C. The reaction of this compound with hydrochloric acid as previously described will produce N-(diethylaminoethyl)-N-benzylamine which is further reacted with propargyl bromide to obtain N-(diethylaminoethyl)-N-propargylbenzylamine boiling at 107° C. at 0.3 mm. pressure. $n_D^{25}$=1.5060.

EXAMPLE 3

The reaction of p-chlorobenzylamine with ethylformate as described in Example 1 results in the formation of N-formyl-p-chlorobenzylamine melting at 107°–108° C. The successive reaction of this compound with diethylaminoethyl chloride, hydrochloric acid and propargyl bromide produces respectively N-(diethylaminoethyl)-N-formyl-p-chlorobenzylamine boiling at 165°–168° C. at 1 mm. pressure, N-(diethylaminoethyl)-N-p-chlorobenzylamine boiling at 142° C. at 3.5 mm. pressure and N-(diethylaminoethyl)-N-propargyl-p-chlorobenzylamine boiling at 124° C. at 0.5 mm. pressure and having a refractive index $n_D^{25}$ of 1.5720.

EXAMPLE 4

The substitution of p-methoxybenzylamine for p-methylbenzylamine in Example 1 and successive reaction with ethyl formate, diethylaminoethyl chloride, hydrochloric acid and propargyl bromide will product respectively:

N-formyl-p-methoxybenzylamine—M.P.=80° C.

N-(diethylaminoethyl)-N-formyl-p-methoxybenzylamine—B.P.=178° C. at 1 mm. pressure.

N-(diethylaminoethyl)-N-p-methoxybenzylamine—B.P.=127° C. at 0.8 mm. and

N-(diethylaminoethyl)-N-propargyl-p-methoxybenzylamine—B.P.=137° C. at 0.6 mm. pressure. $n_D^{25}$=1.5119.

EXAMPLE 5

In the same manner as that described in Example 1, o-chlorobenzylamine is successively reacted with ethylformate, diethylaminoethyl chloride, hydrochloric acid and propargyl bromide to obtain the following compounds, respectively:

N-formyl-o-chlorobenzylamine melting at 69° C.

N-(diethylaminoethyl)-N-formyl-o-chlorobenzylamine boiling at 160° C. at 1 mm. pressure.

N-(diethylaminoethyl)-N-o-chlorobenzylamine boiling at 110° C. at 0.8 mm. pressure and N-(diethylaminoethyl)-N-propargyl-o-chlorobenzylamine boiling at 152° C. at 5 mm. having a refractive index $n_D^{25}$ of 1.5163.

In a similar manner, other compounds considered to be within the scope of the present invention can be prepared by the successive reaction of the appropriate ring substituted benzylamine with ethyl formate, diethylaminoethyl chloride, hydrochloric acid and propargyl bromide. Typical of such compounds are the following:

N-diethylaminoethyl-N-propargyl-p-bromobenzylamine.

N-diethylaminoethyl-N-propargyl-m-ethoxybenzylamine.

N-diethylaminoethyl-N-propargyl-p-propoxybenzylamine.

N-diethylaminoethyl-N-propargyl-o-butoxybenzylamine.

N-diethylaminoethyl-N-propargyl-m-ethylbenzylamine.

N-diethylaminoethyl-N-propargyl-p-isopropylbenzylamine.

N-diethylaminoethyl-N-propargyl-o-tertiary butylbenzylamine.

N-diethylaminoethyl-N-propargyl-p-n-propylbenzylamine.

N-diethylaminoethyl-N-propargyl-m-n-butylbenzylamine.

N-diethylaminoethyl-N-propargyl-p-sec-butylbenzylamine.

N-diethylaminoethyl-N-propargyl-o-bromobenzylamine.

What we claim is:

1. A compound of the formula

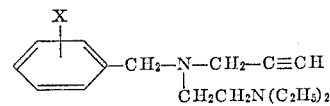

wherein X is a member of the group consisting of hydrogen, chlorine, bromine, loweralkyl and loweralkoxy.

2. N-(diethylaminoethyl)-N-propargyl-p-methylbenzylamine.

3. N-(diethylaminoethyl)-N-propargylbenzylamine.

4. N-(diethylaminoethyl)-N-propargyl-p-chlorobenzylamine.

5. N-(diethylaminoethyl)-N-propargyl-p-methoxybenzylamine.

6. N-(diethylaminoethyl)-N-propargyl-o-chlorobenzylamine.

References Cited in the file of this patent

UNITED STATES PATENTS 2,552,242   Weissberger et al. _____ May 8, 1951
2,830,048   Biel _____ Apr. 8, 1958

OTHER REFERENCES

Adams et al.: "Organic Reactions," vol. 5, p. 302, 1949.